United States Patent
Webster

(10) Patent No.: US 9,751,213 B2
(45) Date of Patent: Sep. 5, 2017

(54) SYSTEM AND METHOD FOR ROBOT OPERATING ENVIRONMENT DISCOVERY

(71) Applicant: ROSS VIDEO LIMITED, Iroquois, Ontario (CA)

(72) Inventor: Neil Webster, Constance Bay (CA)

(73) Assignee: ROSS VIDEO LIMITED, Ontario (CA)

(*) Notice: Subject to any disclaimer, the term of this patent is extended or adjusted under 35 U.S.C. 154(b) by 56 days.

(21) Appl. No.: 14/714,489

(22) Filed: May 18, 2015

(65) Prior Publication Data

US 2016/0339585 A1 Nov. 24, 2016

(51) Int. Cl.
*G05B 15/00* (2006.01)
*G05B 19/00* (2006.01)
*B25J 9/16* (2006.01)
*B25J 5/02* (2006.01)
*B25J 18/04* (2006.01)
*H04N 5/222* (2006.01)

(52) U.S. Cl.
CPC ............. *B25J 9/1638* (2013.01); *B25J 5/02* (2013.01); *B25J 9/162* (2013.01); *B25J 9/1633* (2013.01); *B25J 18/04* (2013.01); *H04N 5/222* (2013.01); *Y10S 901/02* (2013.01)

(58) Field of Classification Search
CPC ..... B25J 9/1638; B25J 5/02; B25J 9/12; B25J 9/161; B25J 9/1633; B25J 11/005; B25J 15/0019; B25J 19/02; B25J 19/023; Y10S 901/02
USPC .......................... 700/245, 253, 256, 260, 261
See application file for complete search history.

(56) References Cited

U.S. PATENT DOCUMENTS

| | | | |
|---|---|---|---|
| 9,030,149 B1* | 5/2015 | Chen ..................... | F16M 13/04 318/638 |
| 9,073,624 B2* | 7/2015 | Jones ...................... | B64C 19/02 |
| 2004/0026349 A1* | 2/2004 | Colgate ................... | B66D 3/18 212/284 |
| 2011/0010008 A1* | 1/2011 | Michel .................... | B25J 9/1605 700/250 |
| 2012/0114181 A1* | 5/2012 | Borthwick ............. | G06T 7/0075 382/104 |
| 2014/0039681 A1* | 2/2014 | Bowling ................. | A61B 34/32 700/261 |
| 2014/0222207 A1* | 8/2014 | Bowling ................. | A61B 34/32 700/261 |
| 2014/0312808 A1* | 10/2014 | Szarzynski ............. | H02P 31/00 318/6 |

(Continued)

OTHER PUBLICATIONS

Reinshaw, "RESOLUTE™ absolute optical encoder—How it works" http://www.renishaw.com/en/resolute-absolute-optical-encoder-how-it-works--10934, Accessed Jun. 11, 2015, but publicly available at least as early as Nov. 15, 2014.

*Primary Examiner* — Jaime Figueroa
(74) *Attorney, Agent, or Firm* — Nixon Peabody LLP; Jeffrey L. Costellia

(57) ABSTRACT

A method of accommodating a payload and determining a working environment in a robotic system is disclosed. The method is directed to using a motor current measurement taken at the axis motors of a robotic system to calculate various parameters including payload balance, mass, moment of inertia, friction force and traction force. This measurement is based on the known relationship between motor current and motor torque.

25 Claims, 14 Drawing Sheets

(56) References Cited

U.S. PATENT DOCUMENTS

| | | | |
|---|---|---|---|
| 2015/0307191 A1* | 10/2015 | Samuel | B64C 33/02 244/22 |
| 2016/0159472 A1* | 6/2016 | Chan | B64C 27/08 244/39 |
| 2016/0264234 A1* | 9/2016 | Vaughn | A63H 27/12 |

* cited by examiner

| | p1 | p2 | p3 | p4 | p5 | p6 | p7 | p8 | p9 | p10 | p11 | p12 | p13 | p14 | p15 | p16 | p17 | p18 | p19 | p20 |
|---|---|---|---|---|---|---|---|---|---|---|---|---|---|---|---|---|---|---|---|---|
| 1304 | s1 | | | | s5 | | | | s9 | | | | s13 | | | | | | | |
| 1300 | | | | | | | | | | | | | | | | | | | | |
| 1306 | s2 | | | | s6 | | | | s10 | | | | s14 | | | | | | | |
| 1308 | s3 | | | | s7 | | | | s11 | | | | s15 | | | | | | | |
| 1302 | | | | | | | | | | | | | | | | | | | | |
| 1310 | s4 | | | | s8 | | | | s12 | | | | s16 | | | | | | | |

FIG. 14C  1420

| | p1 | p2 | p3 | p4 | p5 | p6 | p7 | p8 | p9 | p10 | p11 | p12 | p13 | p14 | p15 | p16 | p17 | p18 | p19 | p20 |
|---|---|---|---|---|---|---|---|---|---|---|---|---|---|---|---|---|---|---|---|---|
| 1304 | b1 | | | | s1 | | | | s5 | | | | s9 | | | | s13 | | | |
| 1300 | p1 | | | | | | | | | | | | | | | | | | | |
| 1306 | b2 | | | | s2 | | | | s6 | | | | s10 | | | | s14 | | | |
| 1308 | b3 | | | | s3 | | | | s7 | | | | s11 | | | | s15 | | | |
| 1302 | p1 | | | | | | | | | | | | | | | | | | | |
| 1310 | b4 | | | | s4 | | | | s8 | | | | s12 | | | | s16 | | | |

FIG. 14D  1420

SYSTEM AND METHOD FOR ROBOT OPERATING ENVIRONMENT DISCOVERY

FIELD OF THE INVENTION

The present disclosure relates to robotics, for example such as used in video production, and to determining the mechanical operating environment of a robotic unit.

BACKGROUND OF THE INVENTION

Robots, for example such as used in automated manufacturing and video production, are known in the art. Robotic systems may allow movement in several degrees of freedom (dimensions and/or axes) through the use of actuators of some form. A robot controller usually controls these robotic systems, the robot controller having processing capabilities, interface and memory. The robotic movement sequences and other robotic controls are typically programmed and stored in the system. The robot may have a payload. In the case of video production, the payload may, for example, include one or a combination of a camera, teleprompter, lenses, talent monitor, counterbalances etc.

BRIEF SUMMARY

According to one aspect of the present invention, there is provided a method of characterizing a robotic system, wherein the robotic system comprises a motor for driving motion of a payload about an axis of rotation, the method comprising: determining a location of a center of mass of the payload by: controlling the motor to hold the payload static in at least three angular positions, and for each position determining a respective torque applied by the motor to hold the payload static; and determining a residual center of mass offset angle and a distance of the center of mass from the axis of rotation based on the determined torques.

According to another aspect of the present invention, there is provided a method in an apparatus comprising a lift motor that lifts a column carrying a head and payload, with passive struts that assist the motor, the method comprising: controlling the lift motor to sequentially raise the column to a plurality of vertical positions and to hold the column steady while in each of the plurality of vertical positions; for each vertical position, determining a force applied by the lift motor to hold the column steady; and determining strut force as a function of vertical position based on the determined motor force and a combined mass of the column, head and payload.

According to yet another aspect of the present invention, there is provided a method for determining holding force $F_0$ and static friction $F_{fs}$ about an axis of a robotic system at a first position, the method comprising: controlling the motor to generate a force that holds the axis steady in the first position; gradually increasing force until movement is detected in a positive direction and storing a value $F_u$ representing the force when movement is detected; returning to the first position and gradually reducing force until movement is detected in a negative direction and storing a second value $F_l$ representing the force when movement is detected; determining the holding force and static friction force based on the first and second value according to:

$$F_0 = \frac{F_u + F_l}{2}$$

and $$F_{fs} = \frac{F_u - F_l}{2}$$

According to still another aspect of the present invention, there is provided a method for determining track characteristics of a track used by a robotic system having at least one motorized wheel running on the track, the method comprising: moving the robot along the track at a substantially constant velocity $v_c$; as the robot changes position on the track, monitoring wheel velocity as a function of position; determining track positions where the wheel velocity is above a wheel velocity consistent with the substantially constant velocity by a threshold amount as positions where there is a loss of traction on the track; and determining track positions where the wheel velocity is below a wheel velocity consistent with the wheel velocity consistent with the substantially constant velocity by a threshold amount as positions that are binding points on the track.

According to another aspect of the present invention, there is provided a robotic control system for use with a robotic system comprising an actuator that causes motion in an axis, the robotic control system comprising: a transmit channel for sending control commands to the actuator; a receive channel for receiving information from the robotic system; a robotic environment characterization controller that, for each of at least one operating characteristic of the robotic system: controls the actuator to perform a predetermined sequence of steps by sending control commands on the transmit channel; receives measurement information on the receive channel following performance of each step of said predetermined sequence of steps; and based on the received measurements, determines the operating characteristic of the robotic system.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 14C shows the platform of FIG. 14B in a first position on the track of FIG. 14A.

FIG. 14D shows the platform of FIG. 14B in a second position on the track of FIG. 14A.

DETAILED DESCRIPTION

Figure 1:
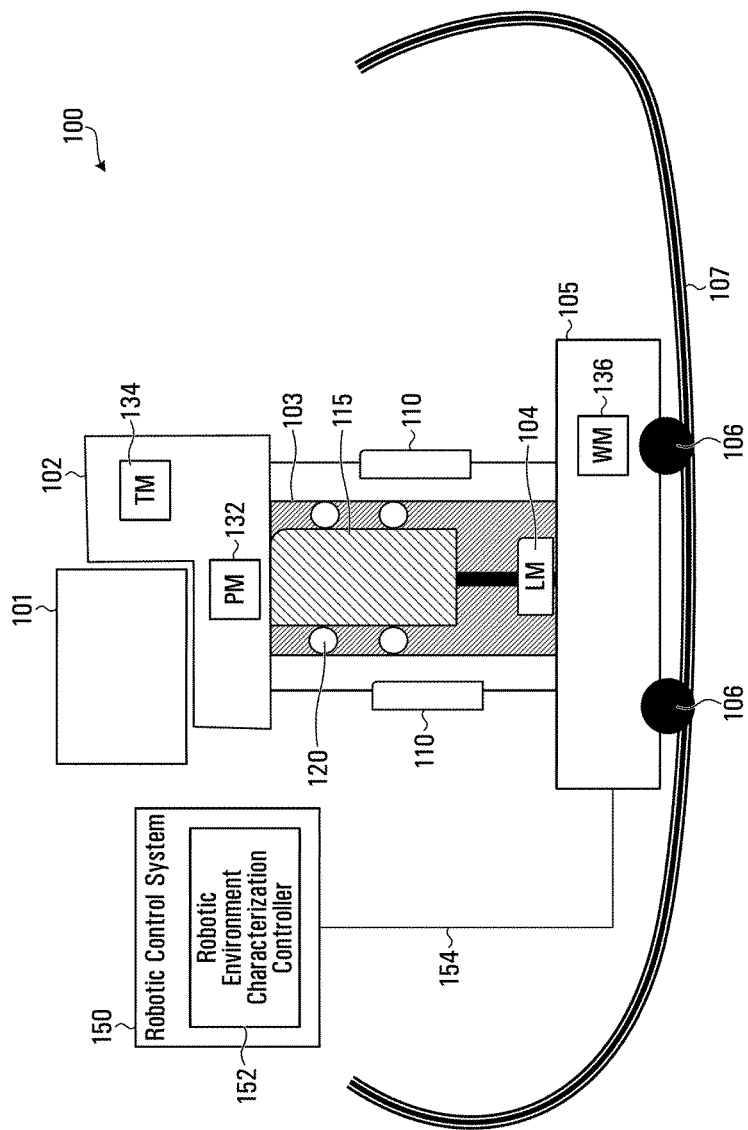
FIG. 1 is an example of a robotic system.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the scope of an invention as defined by the appended claims.

Many automated robotic systems, such as tilt/pan head systems for video production, operate blindly without knowledge of the weight, mass or size of the attached payload and without knowledge of the surrounding environment the robotic system is working in. As a result, the robot may attempt to perform movements that should not be executed based on the payload attached and other physical conditions. The result may be wear on the system and poor quality images from an attached camera.

Embodiments of the invention provide various systems and methods that enable aspects of the operating environment of a robot to be determined. This information can be used in various ways. For example, the information may be used to enable the robot to be set up correctly and to be operated within the mechanical constraints imposed by the environment.

Referring to FIG. 1, an example of a robot or robotic system 100 comprises a payload 101 mounted on a pan tilt head 102. The pan tilt head 102 rests on an elevation column 103. A lift motor (LM) 104 is used to raise and lower the head 102 and payload 101. A pan motor (PM) 132 controls pan motion of the payload, and a tilt motor (TM) 134 controls tilt motion of the payload.

In the illustrated example, elevation column 103 is a linear translation device that consists of telescoping tubes with the head 102 attached to the top. Other lift arrangements may alternatively be used. In the illustrated example, the elevation column 103 comprises an inner column 115 moving on bearings 120. A number of struts 110 (two can be seen in the illustrated embodiment, but more generally there may be zero or more) are attached to the column 103 and work like pistons, to push the column 103 up to assist the lift motor 104 in keeping the pan tilt head 102 at a given height by compensating to a certain extent for gravity.

The robotic system 100 has a base 105. In the illustrated example, the base 105 is mounted on a plurality of wheels 106 for rotating on a track 107. One or more wheel motors (WM) 136 drive one or more of the wheels 106.

The robotic system 100 has control inputs from a robotic control system 150. The robotic control system 150 may be co-located with the remainder of the robotic system 100, but more typically is remotely located, with a control connection 154 that may be wireless or physical. In addition, the robotic control system 150 comprises a robotic environment characterization controller (RECC) shown at 152 that controls the execution of the one or a combination of the methods described herein to characterize one or more aspects of the operating environment. In some embodiments, the RECC is implemented as a program stored in memory that executes on a processor forming part of the robotic control system. The RECC may alternatively be in the robot itself.

Robotic system 100 is a very specific example of a system that might include the RECC. More generally, an RECC can be used in any robotic system in which the operating environment is desired to be known. For example, motors 104, 132, 134, 136 are specific examples of actuators that may be present in a robotic system. Not necessarily all these actuators will be present. For example, a pan tilt head may be implemented with a static vertical position and therefore no lift motor. Alternatively, additional and/or different actuators may be used. More generally, the RECC can be used with a given robotic system that includes one or more actuators that control motion (of the robot as a whole or a part of the robot) in one or more axes, each of which may be a linear axis or a rotational axis.

In the illustrated example, the base has wheels that are designed to move over track 107, the track forming part of the operating environment. In other embodiments, the base is equipped with wheels that are designed to move over a flat surface rather than on a track. In further embodiments, the base may be static.

Some of the methods described herein are based on a known relationship between motor current and motor torque given by the torque factor $K_m$ of the specific motor. Therefore if $K_m$ is known, torque can be determined if the current is known. The known characteristics of the gearing on specific axes can be taken into account to determine the axis torque for a rotational stage and linear force for a translational stage. Motor current is often provided directly from the motion control devices, so in general these measures may be available without the need for additional sensors.

Figure 2:
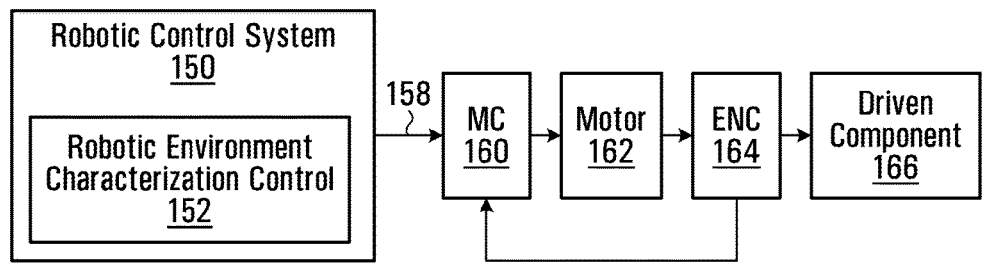
FIG. 2 is a block diagram of a control path for a single motor.

FIG. 2 is an example of a control path for a single motor/actuator in a robotic control system. Shown is the previously introduced robotic control system 150 containing the RECC connected to a motor controller (MC) 160. The system may have one or more motors; typically each motor has a respective motor controller. More generally, there may be actuators and actuator controllers. There is a transmit channel for sending control commands to the motor/actuator, and a receive channel for receiving information from the robotic system. In the illustrated example, this connection is through a CAN (controller area network) bus 158 but more generally could be through any networking technology. The motor controller 160 is connected to an encoder (ENC) 164 and to a driven component 166 via a drive shaft, for example. The encoder 164 encodes a position at the output of the motor (for example drive shift position) and feeds this back to the motor controller 160. The motor controller 160 may feedback the encoded position data to the robotic control system 150 for position tracking. Also, some axes may have two encoders; one on the output of the motor prior to gearing, and one attached to the load after the gearing.

The RECC controls the robotic system to make one or more static and/or dynamic measurements to thereby establish one or more operating characteristics of the robotic system.

A method of characterizing a behaviour of a robotic system in respect of an axis of the robotic system is provided. This method is applicable to any moving axis in a robotic system. The description that follows assumes a translational (i.e. linear) axis but the description is valid for rotational stages as well. For rotational stages, force (F) is replaced with torque (τ), acceleration (a) is replaced with angular acceleration (α) and mass (m) is replaced with moment of inertia (I).

Figure 3:
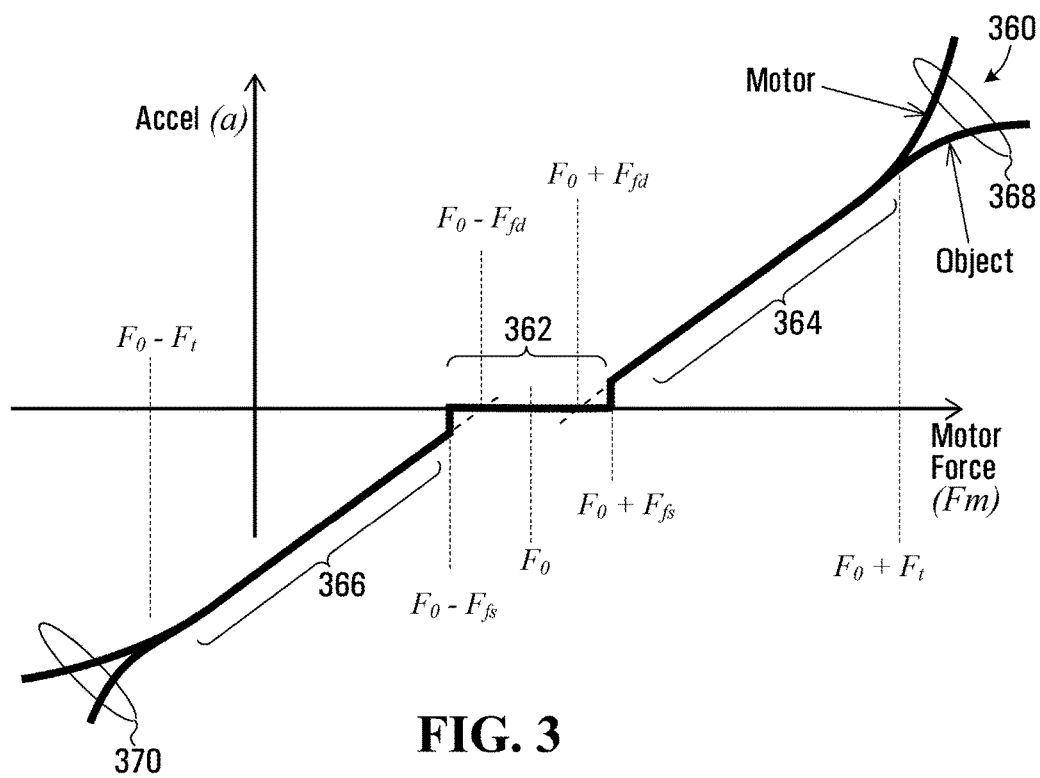
FIG. 3 shows an example plot of acceleration vs. motor force for an axis in a robotic system.

Referring now to FIG. 3, curve 360 provides an example of behavior of a robotic system along an axis of a robotic system in terms of acceleration (a, depicted as the vertical axis) as a function of motor force (Fm, depicted as the horizontal axis). The behavior is affected by the mass that is to be moved along the axis, static force, static friction, dynamic friction and a traction limit, all of which are detailed below. Note that the behavior of a robotic system about a given typical axis may exhibit each of these phenomena in varying degrees and with varying root causes.

It can be seen that there is a region 362 of curve 360 where there is zero acceleration. This is a steady state position. From curve 360, it can be seen that a motor force ($F_0$) is required to hold the axis in steady state, also referred to as a holding force. In some embodiments, the holding force may be zero, or close to zero. This force ($F_0$) could be to counter gravity as an example. In the illustrated example, it is assumed that steady state is zero acceleration, and zero speed. A similar curve can be generated starting from an assumption of zero acceleration, but non-zero speed. In that case, the curve would not include any effect due to static friction as that will have already been overcome to get to the constant speed condition.

The axis exhibits static friction and this needs to be overcome to cause the axis to move. In the illustrated example, the axis begins to move when the motor force Fm exceeds $F_0+F_{fs}$ or goes below $F_0-F_{fs}$, where $F_{fs}$ is a static friction force. Once a force has been applied that overcomes static friction, the axis starts to move with an acceleration closely approximated by Newton's second law (F=ma). The slope of the graph in the linear regions 364,366 represents the mass of the object being moved.

As higher forces are applied the axis may hit a traction limit. At this point the motor acceleration and object acceleration lose correlation as indicated by the diverging curves 368 for the motor and object in the positive direction, and diverging curves 370 in the negative direction.

Figure 4:
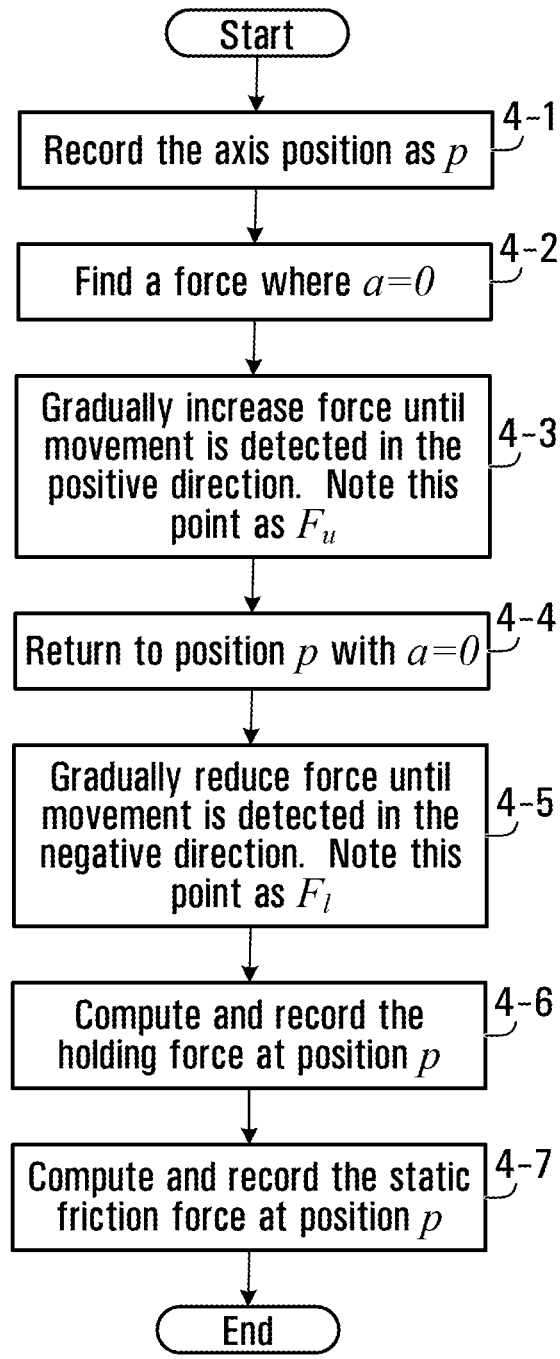
FIG. 4 is a flowchart of a method to determine holding force and static friction force.

FIG. 4 is a flowchart of an example of a method, that might for example be implemented by the RECC of FIG. 1, to determine holding force ($F_0$) and static friction force ($F_{fs}$) at various positions of an axis.
- Block 4-1: Record an axis position as p
- Block 4-2: Find a force where a=0 i.e. hold steady
- Block 4-3: Gradually increase force until movement is detected in the positive direction. Note this point as $F_u$
- Block 4-4: Return to position p with a=0
- Block 4-5: Gradually reduce force until movement is detected in the negative direction. Note this point as $F_l$
- Block 4-6: Compute and record the holding force at position p as follows:

$$F_0 = \frac{F_u + F_l}{2}$$

Block 4-7: Compute and record the static friction force at position p as follows:

$$F_{fs} = \frac{F_u - F_l}{2}$$

$F_0$ may be a positive value or a negative value, and in some cases may be zero or close to zero. $F_{fs}$ may be close to zero.

A method of determining static friction force has been described. In a specific example, this is used to determine characteristics relating to a track system used by a robot. More generally, this approach can be applied in any drive system that has an initial static friction that is to be overcome before the system is in motion about a particular axis. In some embodiments, static friction is measured at multiple positions, and a report containing tabular and/or statistical information may be generated and/or out of range values may be flagged. In some embodiments an automatic track characterization regimen is implemented in which the system automatically controls the robot to one or a plurality of track positions, and makes the static friction force measurement at each position.

Figure 5:
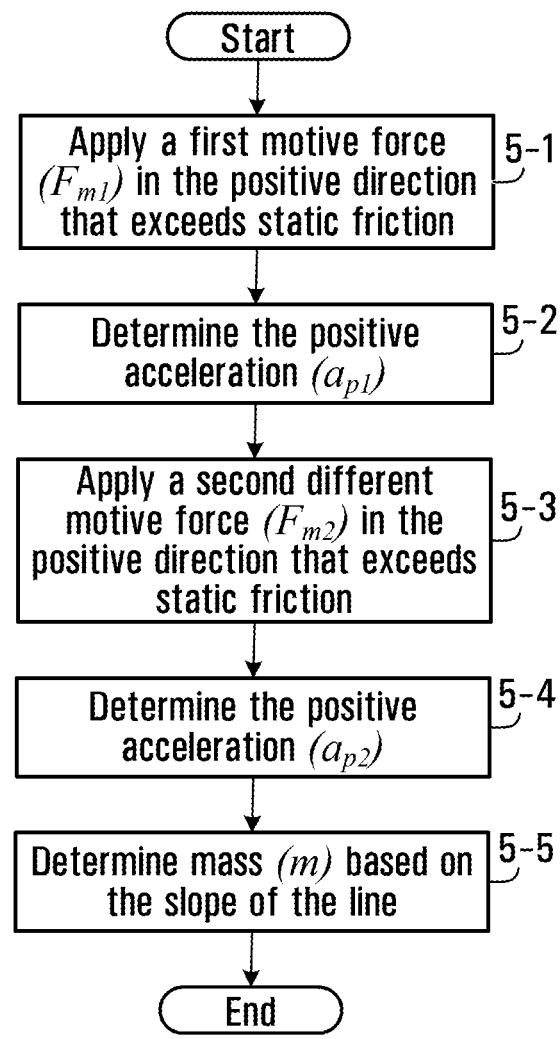
FIG. 5 is a flowchart of an example of a method to determine mass and dynamic friction.
Figure 6:
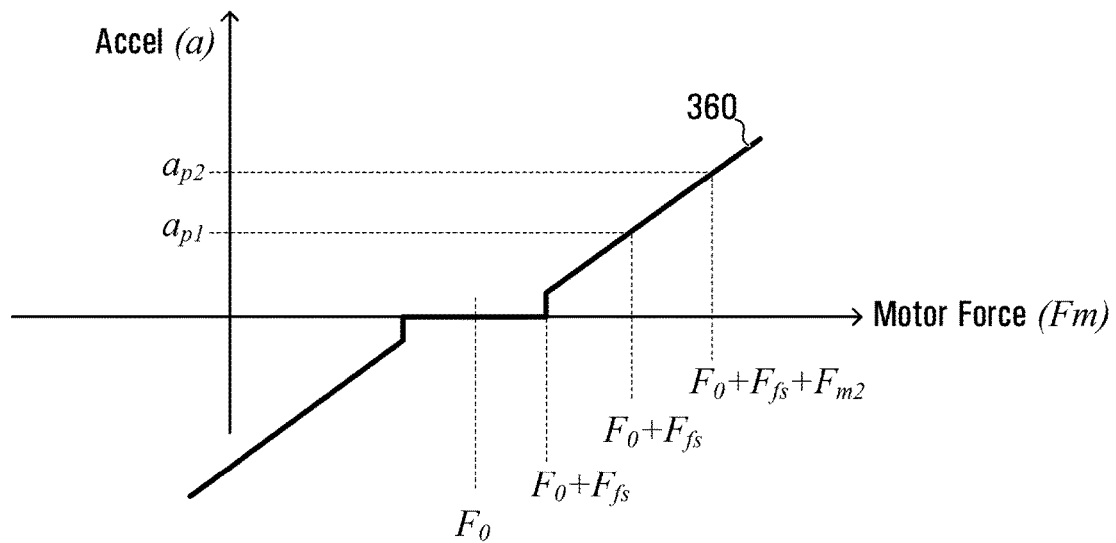
FIG. 6 shows an example of acceleration vs. motor force for an axis in a robotic system for the purpose of determining mass and dynamic friction.

FIG. 5 is a flowchart of an example of a method, that might for example be implemented by the RECC of FIG. 1, to determine mass and dynamic friction. As noted above, the slope of the line in the linear regions 364,370 represents the mass. Since there are two unknowns of mass (m) and dynamic friction force ($F_{fd}$), by identifying at least two points on the line, these two unknowns can be determined. This method will be described also with reference to FIG. 6 which shows a portion of the curve 360 of FIG. 3, and with additional points annotated.
- Block 5-1: apply a first motive force ($F_{m1}$) in the positive direction that exceeds static friction
- Block 5-2: determine the positive acceleration ($a_{p1}$), for example by performing a double differentiation on position
- Block 5-3: apply a second different motive force ($F_{m2}$) in the positive direction that exceeds static friction
- Block 5-4: determine the positive acceleration ($a_{p2}$) by performing a double differentiation on position
- Block 5-5: determine mass (m) based on the slope of the line as follows:

$$m = \frac{F_{m2} - F_{m1}}{a_{p2} - a_{p1}}$$

Block 5-6: determine dynamic friction as follows:

$$F_{fd} = F_{fs} + F_{m1} - \frac{a_{p1}}{m}$$

At this point a sanity check can be made, that the computed value of $F_{fd}$ is both positive and less than $F_{fs}$.

Optionally, as a confirmation, the same test can be performed in the opposite direction. The mass and dynamic friction force computations should correlate within experimental limits.

A description of a method of determining moment of inertia (about a rotational axis) and mass (about a linear axis) was described above. In a specific example, the method can be applied to lift measurements, and may be used to determine the total mass $m_t$ carried by a column (such as column 103 of FIG. 1). At least two known force values are applied in order to characterize the slope of the linear region of the acceleration vs. force curve, and thereby determine the total mass. The calculated mass $m_t$ is comprised of the payload mass $m_p$ attached to the head, the head mass $m_h$ and the moving part of the column mass $m_c$ such that:

$$m_t = m_p + m_h + m_c$$

In general, $m_h$ and $m_c$ are known and fixed. Therefore, $m_p$ can be computed as:

$$m_p = m_t - m_h - m_c$$

The lift motor may, for example, have a rotational stage with a lead screw that converts rotational motion into translation as a function of gearing in the motor. In a rotational motor, the torque is defined by:

$$\tau = F \times r = K \times i$$

Where F is the applied force at a radius r, K is the known torque constant, and i the applied current which is known.

The linear acceleration of the column can, for example, be determined from position information encoded by an encoder at the output of the lift motor. In some embodiments, this encoder encodes rotational position (which can be directly converted to linear position as a function of the gearing) or linear position. Multiple position measurements can be converted to acceleration. For example, the acceleration may be determined by performing a double differentiation on the measured position from the encoder.

It is noted that where there are more than two moving parts of the column mass, as in a telescoping arrangement, with the moving parts moving at different speeds, the above-discussed equations would need to be adjusted accordingly.

In another example, the method can be applied to determine moment of inertia about a pan axis, for example of a system similar to that of FIG. 1. A similar approach can be applied for other axes. At least two known torque values $\tau_p$ are applied in order to characterize the slope of the linear region of the rotational acceleration vs. torque curve, and thereby determine the moment of inertia. The known torque is a function of the applied current according to:

$$\tau_p = K \times i$$

The position about the pan axis can be determined for example from an encoder that encodes position at the output of the pan motor, and this position information can be converted into the angular acceleration $\alpha_p$ by taking the characteristics of the gearing into account and performing a double differentiation.

In the illustrated system of FIG. 1, the robotic system moves on a track 107 under the force of the wheel motor 136 which drives one or more of the wheels 106. So long as there is traction between the wheels and the track, there is a linear relationship between force and acceleration. However, when the force becomes high enough, the wheels can begin to slip, and the linear relationship between force and acceleration is no longer present. Two methods are presented for determining traction force, which is the force at which the traction is lost. This is particularly applicable to the axis involving motion along a track, but it has more general applicability to any axis of a robotic system. For example, in a pan axis, there may be belt slip.

Figure 7:
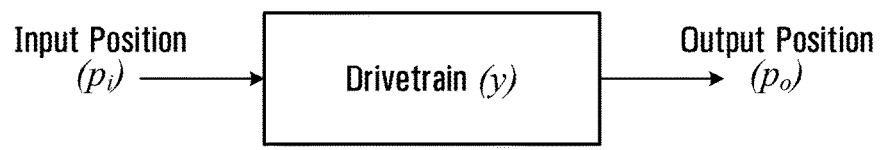
FIG. 7 depicts the relationship between output position and input position for a drivetrain.

A first method of determining the traction force employs independent measurement systems on the input and output of the drivetrain. The drivetrain has an effective gear ratio ($\gamma$) as shown in FIG. 7, where the following equation defines the relationship:

$$p_o = \gamma p_i$$

where $p_i$ is the input position, and $p_o$ is the output position. Notwithstanding the use of the expression "gear ratio", the drive train may or may not actually have gears. Given that output position is a function of traction/loss of traction etc., the gear ratio (irrespective of the actual presence or not of gears) as defined will also be a function of traction/loss of traction, etc.

In normal operation the gear ratio is typically a constant ($\gamma_0$). It is known at the time of design or can be computed experimentally by moving the axis at a low velocity and computing the ratio of output and input velocities as shown below:

$$\gamma_0 = \frac{\dot{p}_o}{\dot{p}_i}$$

where $\dot{p}_i$ is the input velocity, and $\dot{p}_o$ is the output velocity.

Figure 8:
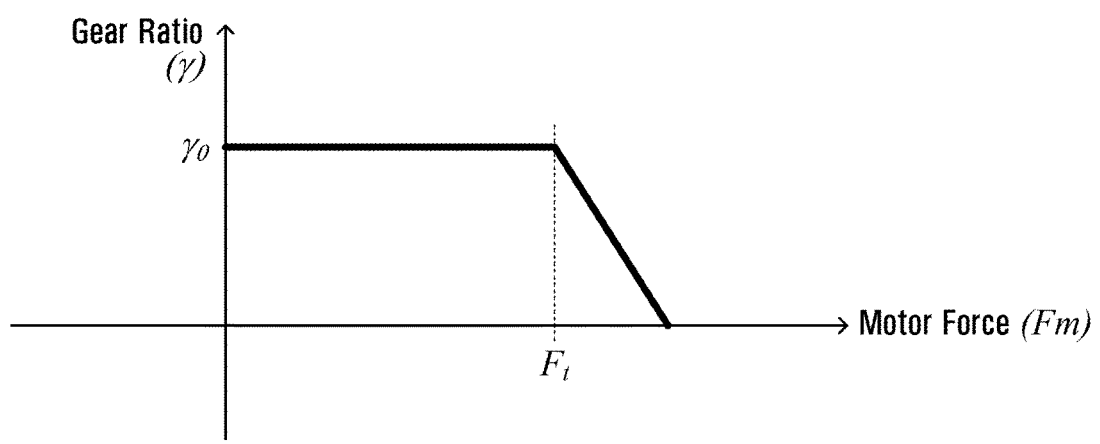
FIG. 8 depicts an example plot of gear ratio as a function of motive force, for the purpose of illustrating loss of traction as measured gear ratio reduction.

When loss of traction occurs, $\gamma$ begins to rapidly reduce below the nominal value of $\gamma_0$ as shown by way of example in FIG. 8.

Figure 9:
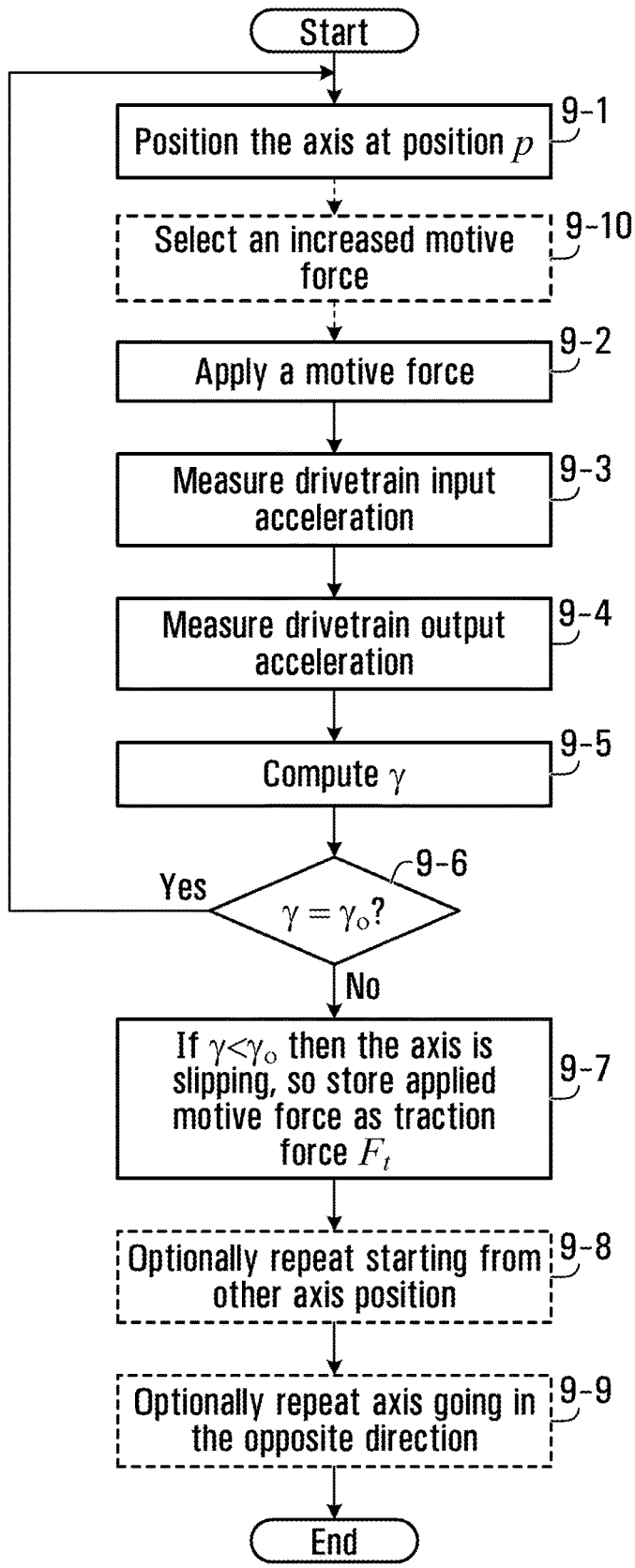
FIG. 9 is a flowchart of a method to determine traction force.

FIG. 9 is a flowchart of a method, that might for example be performed using the RECC of FIG. 1, to determine traction based on the above described approach. Note that the traction force may vary as a function of position. To get an accurate view of the traction force over a range of positions requires the measurements to be conducted for multiple positions. The method involves computing $\gamma$ at a range of increasing forces to determine the point at which it drops significantly below $\gamma_0$.

Block 9-1: Position the axis at position p

Block 9-2: Apply a motive force

Block 9-3: Measure drivetrain input velocity (for example by performing single differentiation on input position)

Block 9-4: Measure drivetrain output velocity by performing single differentiation on output position;

Block 9-5: Compute $\gamma$

Figure 10A:
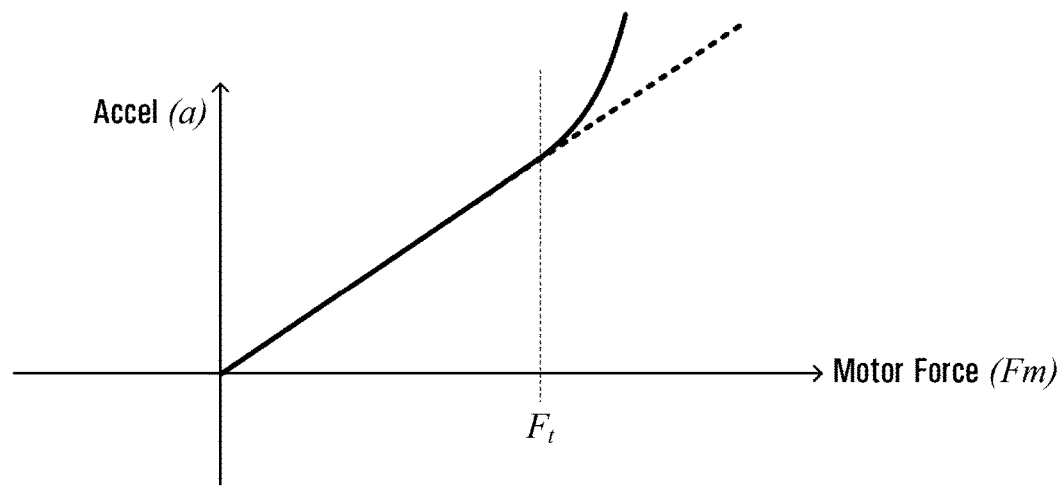
FIG. 10A depicts an example plot of acceleration as a function of motive force for the purpose of illustrating loss of traction as an apparent mass increase.
Figure 11:
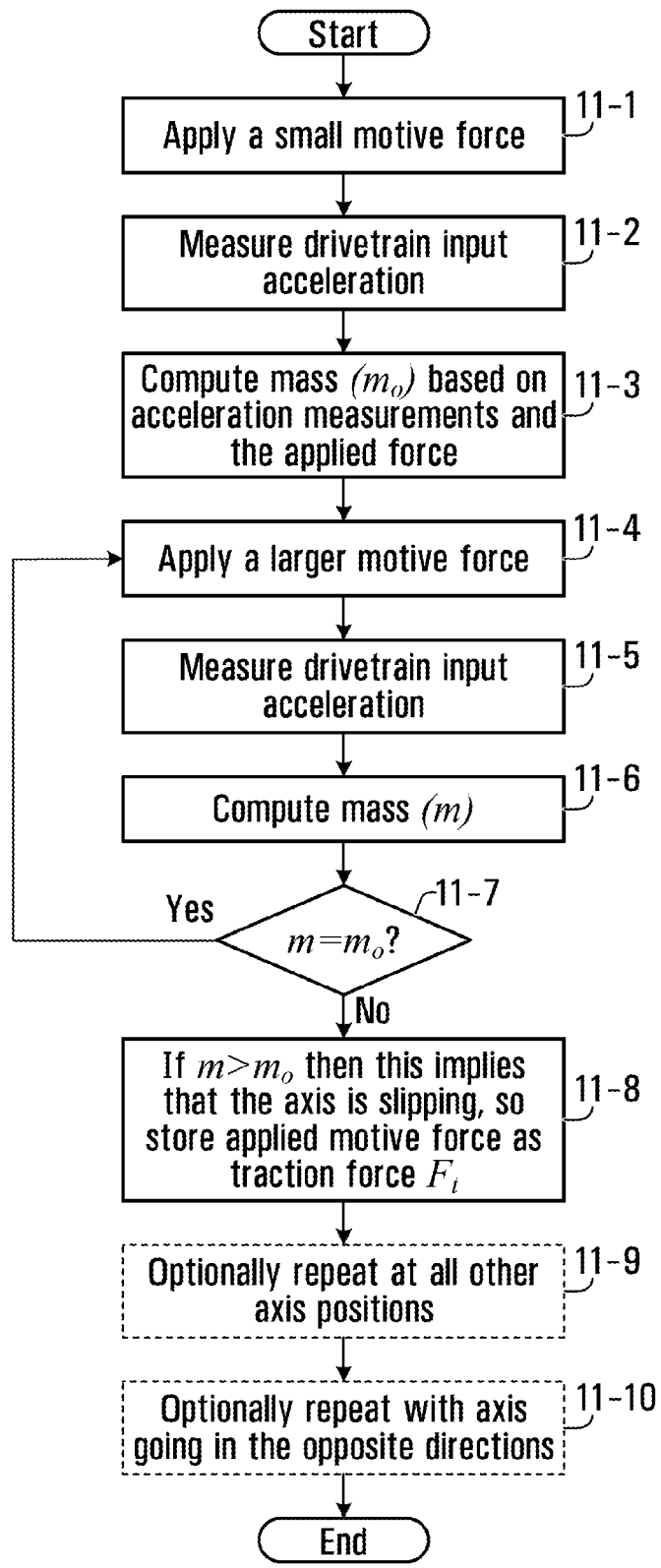
FIG. 11 is a flowchart of another method of determining loss of traction.

Block 9-6: If $\gamma = \gamma_0$, go back to Block 9-1, select an increased motive force in Block 9-20, and repeat remaining steps with the higher motive force Block 9-7: If $\gamma < \gamma_0$ then the axis is slipping, so store applied motive force as traction force $F_t$ Block 9-8: optionally repeat starting from other axis positions Block 9-9: optionally repeat axis going in the opposite direction A second method of determining the traction force relies on the fact that the mass of the object being moved is constant. Therefore if a net motive force is applied, the acceleration should be proportional to the applied force, with the constant of proportionality being the object's mass. When the traction limit is reached the acceleration of the input to the drive train rises above what would be expected if the actual object being moved was being accelerated as shown in FIG. 10A. FIG. 11 is a flowchart of a method of determining loss of traction based on this approach.

Block 11-1: Apply a small motive force

Block 11-2: Measure drivetrain input acceleration by performing double differentiation on input position Block 11-3: Compute mass (m$_0$) based on acceleration measurements and the applied force Block 11-4: Apply a larger motive force Block 11-5: Measure drivetrain input acceleration by performing double differentiation on input position Block 11-6: Compute mass (m)

Block 11-7: If m=m$_0$ this implies that the axis is not slipping so go back to Block 11-4

Block 11-8: If m>m$_0$ this implies that the axis is slipping, so store applied motive force as traction force F$_t$ Block 11-9: optionally, repeat at other axis positions Block 11-10: optionally, repeat with axis going in the opposite directions A method of determining traction force has been described. In a specific example, this is used to determine characteristics relating to a track system used by a robot. More generally, this approach can be applied in any drive system in which there is a potential for loss of traction. In some embodiments, the traction force is measured at multiple positions, and a report containing tabular and/or statistical information may be generated and/or out of range values may be flagged. In some embodiments an automatic track characterization regimen is implemented in which the system automatically controls the robot to one or a plurality of track positions, and makes the traction force measurement at each position.

Figure 10B:
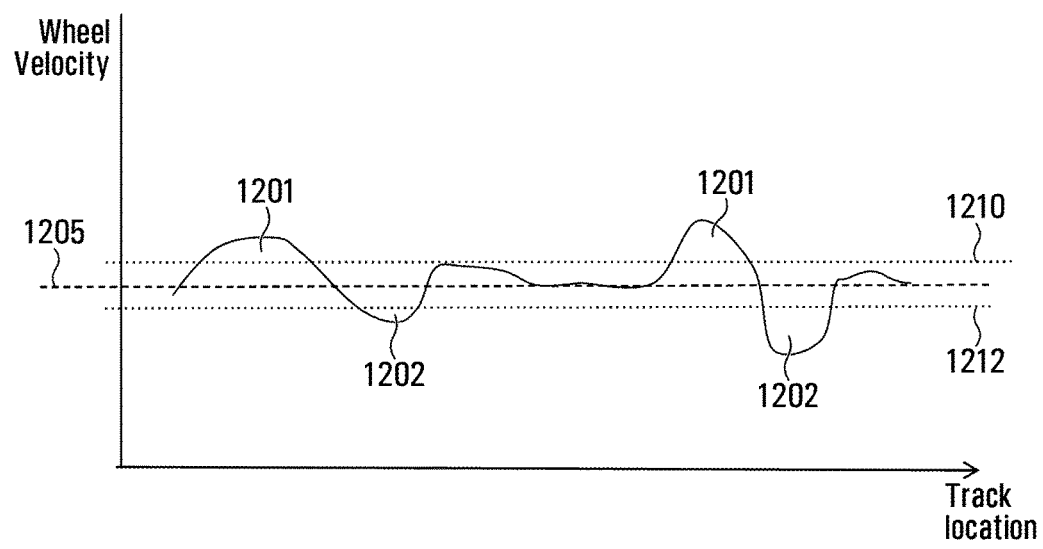
FIG. 10B depicts an example plot of wheel velocity as a function of track position

The previous measurements (for friction and traction) are spot measurements at certain positions. As a result this does not yield friction or traction limits between the measured points. In another embodiment, in order to determine more comprehensive track characteristics (more generally characteristics along any axis), the robot is moved along the track (axis) at a constant velocity v$_c$. For this, absolute position information would be best as opposed to wheel speed, but if operating in between the friction and traction limits, the two should be correlated. Since the robot is going at a constant velocity, there should be no net force acting on the system and the motor force F$_m$ should equal the friction force F$_f$. As the robot changes position on the track, the wheel velocity is monitored. An example is of wheel velocity as a function of track position shown in FIG. 10B. If the track system is perfectly even, the wheel velocity would be constant at v$_c$ 1205. Thresholds above 1210 and below 1212 v$_c$ are set and the track positions 1201 where the wheel velocity is above the upper threshold 1210 may be flagged indicating loss of traction (non-level track). The track position 1202 where the wheel velocity is below the lower threshold 1212 may be flagged indicating a binding point in the track.

Figure 12A:
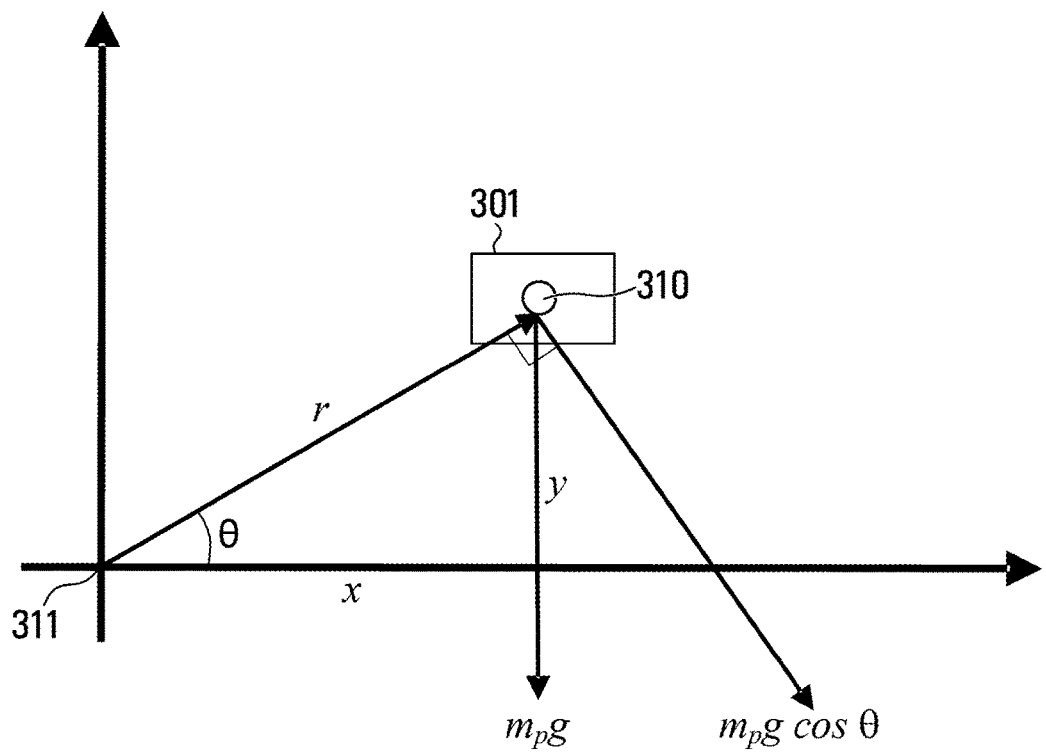
FIG. 12A is a schematic diagram showing center of mass offset.

In another example method of characterization of the operating environment, a method of determining payload center of mass is provided for a rotational stage. The location of the center of mass of a payload is a function of its installation, for example on a pan tilt head such as pan tilt head 102. Referring now to FIG. 12A, shown is a graphical representation of the center of mass 310 of a payload 301. Shown is an axis of rotation 311, coming out of the page. For this example, it is assumed that this is a tilt axis of rotation. The payload 301 is unbalanced when the center of mass of the payload is not collocated with the axis of rotation 301. In the illustrated example, the center of mass 310 is positioned a distance r from the axis of rotation and at an angle θ with respect to a horizontal plane. Equivalently, the center of mass is a distance x from the axis of rotation in a horizontal direction and a distance y from the axis of rotation in a vertical direction, as depicted. In an unbalanced situation, to hold the payload 301 steady about axis 311, a torque τ needs to be applied. The actual applied motor torque at a given instant can be obtained from the current applied to the tilt motor according to $$\tau = Ki$$

where i is the applied current, and K is the torque constant of the motor. In addition, the torque caused by an imbalanced payload can be determined according to $$\tau = m_p gr \cos\theta$$

where m$_p$ is the mass of the payload, g the acceleration due to gravity, m$_p$ is the mass of the payload, g acceleration due to gravity, r is distance from axis of rotation and θ is the angle subtended at the axis of rotation between the center of mass and the horizontal axis. In a steady state situation, the applied motor torque equals the payload torque.

The angle θ is broken into two components and is made up of a deliberately applied rotation θ$_α$ through control of the pan tilt head, and a residual θ$_r$ also referred to herein as residual center of mass offset angle, based on the payload and how it has been fitted to the pan tilt head 102. The following formula applies:

$$\tau = m_p gr \cos(\theta_\alpha + \theta_r)$$

The two unknown values, r and θ$_r$, need to be determined. Two equations may be obtained by setting the applied angle to two known values of θ$_α$, for example θ$_α$=0 and θ$_α$=φ. At each of these positions, a torque required to hold the load steady is measured or determined (for example based on the applied current in each of these situations as described above). The applied torque at the two angles satisfies the following equations:

$$\tau_0 = m_p gr \cos(0 + \theta_r) \quad (1)$$

$$\tau_1 = m_p gr \cos(\phi + \theta_r) \quad (2)$$

Equation (1) can be combined with equation (2) to determine the value of θ$_r$ as follows:

$$\theta_r = \arctan\left(\frac{\tau_0 \cos\phi - \tau_1}{\tau_0 \sin\phi}\right) \quad (3)$$

With a value for θ$_r$, the applied tilt angle θ$_α$ may be set to −θ$_r$, such that the center of mass is horizontally positioned relative to the tilt axis (y=0). Another torque measurement is taken τ$_2$ at that angle in order to determine the value of r using the following formula:

$$\theta_a = -\theta_r \quad (4)$$
$$\tau_2 = m_p gr \cos(\theta_a + \theta_r)$$
$$\tau_2 = m_p gr \cos(-\theta_r + \theta_r)$$
$$\tau_2 = m_p gr$$
$$r = \frac{\tau_2}{m_p g}$$

Figure 12B:
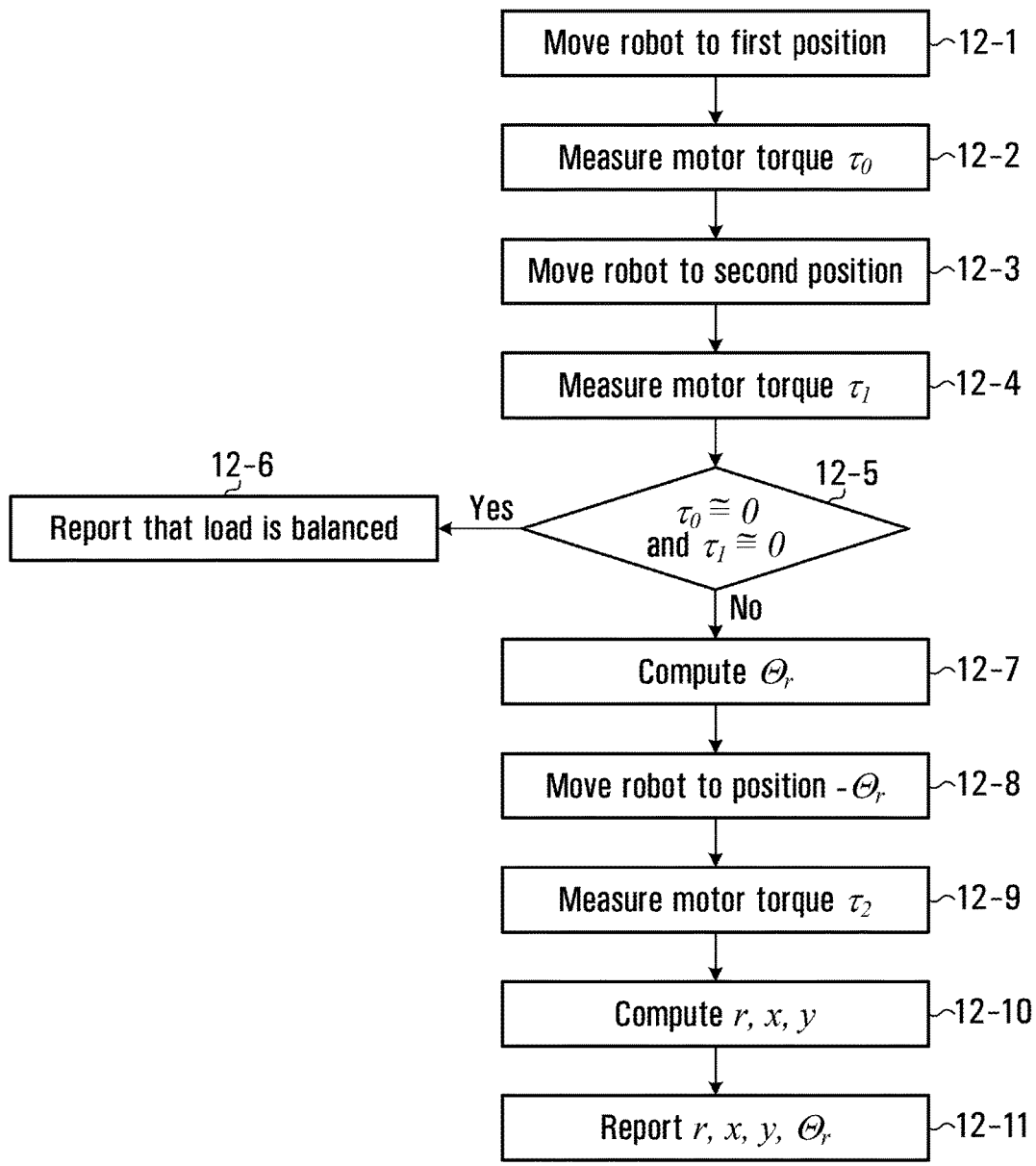
FIG. 12B is a flowchart of a method of determining the center of mass offset.

FIG. 12B shows an example of a method used to characterize a center of mass of a payload. The payload is moved to a first angular position in block 12-1. The motor torque τ$_0$ to maintain position is measured in block 12-2. The payload is moved to a second angular position in block 12-3. A second motor torque to maintain position τ$_1$ is measured in block 12-4. If the torque measurements are negligible or below a predetermined threshold in block 12-5, the system is deemed balanced in block 12-6, i.e. the center of mass is substantially co-located with the axis of rotation. Otherwise $\theta_r$ is computed in block 12-7 based on equation (3) above. The payload is moved to position $-\theta_r$ and another torque measurement $\tau_2$ is taken in block 12-8. The value of r can be computed in block 12-9 based on equation (4) above. The offset x and y can be calculated as:

$$x = r\cos(\theta_r)$$

$$y = r\sin(\theta_r)$$

The value of r, x, y and $\theta_r$ are reported 12-10 and can be used to balance the payload. Specifically, by moving the payload by a distance x in the horizontal direction, and a distance y in the vertical direction, the payload will be balanced about the tilt axis.

A similar approach can be used to determine center of mass and balance for a payload about any axis of rotation. For example, in some embodiments, the above approach is also, or alternatively, performed to balance the center of mass about the pan axis. However, when the robotic system is operating on a flat surface, the pan axis will operate in the horizontal plane and will not be subject to gravity. More generally, in an unbalanced state, the torque to hold the payload static will be a function of location, and follow a sine wave, with the zero points being when the center of mass is directly above and directly below the axis of rotation, and with minimum and maximum being when the center of mass is horizontal to the axis of rotation. The sine wave will have an amplitude and a phase. The amplitude is representative of the size of the offset of the center of mass. The phase, or the point where the sine wave crosses zero, represents the residual offset angle. Rotating the center of mass to three angular positions, as was done in the method of FIG. 12B, is sufficient to characterize the sine wave, and determine the position of the center of mass. Three or more points on a sine wave characterize the sine wave in terms of its magnitude and phase. As such, more generally, three or more measurements can be made to characterize the sine wave, and thereby characterize the position of the center of mass.

Strut Measurements

With reference to FIG. 1, recall struts 110 may be provided to assist maintaining the column in a balanced position against gravity. The number and position of these struts is implementation specific. In some embodiments, a series of static measurements are used to characterize the struts and/or to estimate whether the struts attached to the columns are appropriate to hold the column in place or if additional forces from the motor are required to maintain the static position. For example, if the weight of the column is greater than the compensating force of the struts, there will be a downward force from the column that needs to be compensated for by the motor.

The forces acting on the column are the applied motor force $F_m$, the cumulative force from the strut or struts $F_s$ and the force due to gravity $F_g$. To hold the column steady, all these forces must balance such that:

$$F_m + F_s + F_g = 0 \quad (5)$$

The strut force $F_s$ is a function of strut extension z. The force due to gravity is replaced by the mass multiplied by g, the acceleration due to gravity, the negative indicating its direction. The mass is an input to this method that can, for example, be coded as a parameter, or measured using the method described previously. Therefore equation (5) becomes:

$$F_m + F_s(z) - mg = 0 \quad (6)$$

Because the strut force is non-uniform as a function of z, but the mass is constant, it is not possible for the strut force to offset the force of gravity over a range of vertical positions. In addition, exchanging the payload for one with a different mass will affect the motor necessary to achieve balance. It would ideally be the case that the struts are installed to achieve balance at a selected location, such that the motor needs to provide very little force to hold a payload in a steady position in that selected location.

Figure 13:
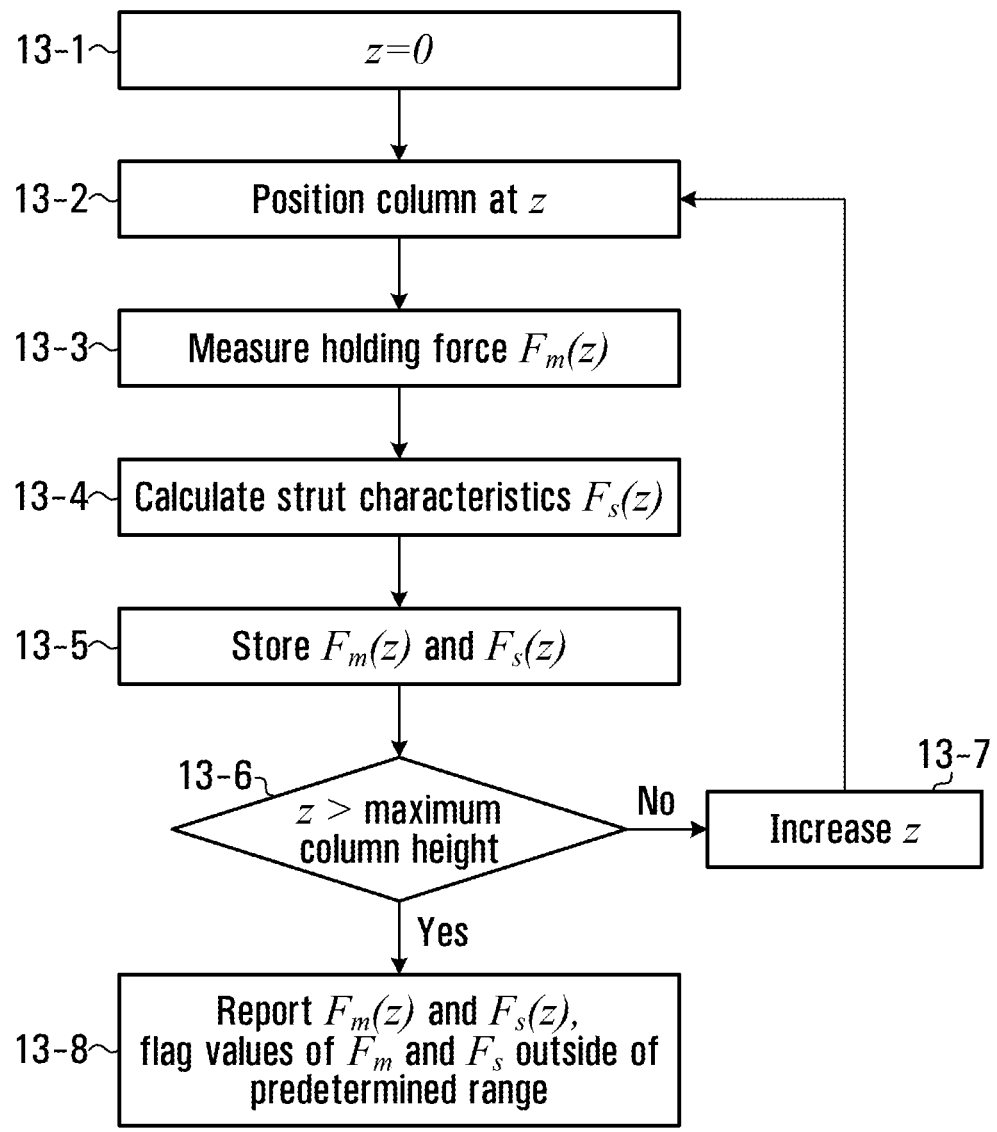
FIG. 13 is a flowchart of a method of determining holding force and strut characteristics.

A specific method will now be described with reference to FIG. 13. Starting from at an elevation z=0 in block 13-1, the column with payload in place is positioned at elevation z in block 13-2. The holding force of the motor $F_m(z)$ is measured at block 13-3. If the mass (m) is known then the following formula may be used to determine the strut characteristics $F_s(z)$ 13-4:

$$F_s(z) = mg - F_m(z)$$

The values of $F_s(z)$ and $F_m(z)$ can be reported at block 13-5 to the user to help with the proper strut installation. The elevation z is increased (block 13-7) and the measurement and calculation performed again, until a maximum height is reached as determined in block 13-6 at which point the measurements outside of a predetermined range can be flagged to the user in block 13-8. $F_s(z)$ can be compared against expected values for the installed struts e.g. if we have 2×250N struts, we would expect $F_s(z)$ to be around 500N. It is robot dependent. Some systems that have large motors can be implemented with small struts. Other systems need stronger struts as the motors are smaller. Unexpectedly large $F_s(z)$ values may be flagged as an indication the motor is being overworked for example.

One or more of the static and dynamic measurements described above can be performed in isolation, or in an automated sequence of any combination of two or more to report the operating characteristics of the robotic system.

In a given robotic system, one or more of the measurements above can be made on one or more axes in the robotic system. The table below contains comments on the various measurements as applied to each of Pan, Tilt, Lift, and track axes that may exist in a robot. A specific implementation may elect not to test certain aspects, for example there might be no attempt to compute traction force for pan, tilt and lift.

| Axis | TEST 1 Holding force or torque | Static friction | TEST 2 Mmass or moment of inertia | Dynamic friction | Test 3 (traction) |
|---|---|---|---|---|---|
| Pan | Should be zero unless mounted at an angle | Gear friction | Moment of inertia about | Gear friction | Belt slip but should not be |

-continued

| | TEST 1 | TEST 2 | | | Test 3 |
|---|---|---|---|---|---|
| Axis | Holding force or torque | Static friction | Mmass or moment of inertia | Dynamic friction | (traction) |
| | | should be low | pan axis | should be low | possible |
| Tilt | Should be zero with correctly balanced payload, otherwise indication of extent of unbalance (See Note 1) | Gear friction should be low | Moment of inertia about tilt axis | Gear friction should be low | Belt slip but should not be possible |
| Lift | Weight of head and payload against struts | Leadscrew friction | Combined mass of payload, head and top part of lift | Leadscrew friction | Belt slip but should not be possible |
| Track | Tension force of wiredraw linear encoder | Cable drag | Combined mass of payload, head, lift and dolly | Cable drag | Wheel slip |

The following is an example sequence of measurements to characterize a mechanical environment:
1. Run track test to determine holding force, dynamic and static friction force, traction force, total robot mass.
2. Run lift test to determine mass of column and attached head and payload, and friction forces.
3. Run Pan and Tilt tests to determine moments of inertia in pan and/or tilt axes, and to determine static and dynamic friction torques. Note these results will change after balancing.
4. Run static lift test to measure and report $F_m(z)$ and determine $F_s(z)$ using the previously determined value of the mass of the column and attached head and payload. Knowledge of installed head type can be used to estimate mass of payload.
5. Run static tilt test to determine offset center of mass from tilt axis (r and $\theta_r$) using previously estimated value of mass payload. These can be converted to x and y offsets with $x=r \cos \theta_r$ and $y=r \sin \theta_r$.

However it should be noted that these tests can be run independently and the complete sequence would not always be needed provided that previous measurements were stored in non-volatile memory. For example if balancing the payload, the payload balance test could be performed repeatedly with payload adjustments in between.

Example Report—note optionally the report may indicate when each parameter was last updated
Payload
  Mass of payload: 50 kg
  Moment of Inertia
    Pan: 4.2 kg m^2
    Tilt: 7.3 kg m^2
  Balance
    Motor Holding Torque: 0.4 Nm
    x offset: 12 mm
    y offset: 4 mm
Struts
  Motor Holding Torque
    Top: 0.3 Nm
    Mid Point: −0.2 Nm
    Bottom: −0.5 Nm
  Strut Force
    Extended: 130 N
    Mid Point: 140 N
    Compressed: 150 N
Track
  Mass of Robot: 100 kg
  Track Friction Force
    @0 m: 10 N
    @1 m: 15 N
    @2 m: 13 N
    @3 m: 20 N
  Track Traction Force
    @0 m: 120 N
    @1 m: 140 N
    @2 m: 130 N
    @3 m: 90 N
  Binding Points located at
    3.6 m
    4.9 m
  Wheel Slip at
    5.6 m A method that characterizes any specific one or combination of two or more of the above described robotic operating environment parameters is contemplated.

In some embodiments, one or more of the robotic operating environment parameters are fed back in some manner to an operator. This can include on screen, generation of a printed report, or a message to name a few examples. The operator may for example use the information for one or more of:
  Use the center of mass information to help adjust the payload to achieve balance;
  Ensure the mass is within specifications for the system
  Use the track information to inspect the track and make adjustments;
  Use the information to manually adjust control of the robotic system;
  Check that struts are installed and working correctly;
  Ensure that the system is operating within its defined max payload and moment of inertia;
  Identify excessive cable drag and possible binding points, and identify slipping wheels and/or belts.

In some embodiments, one or more of the robotic operating parameters are fed back and used by the system to automatically make adjustments. In one embodiment, the payload is mounted to the pan tilt head on a motorized platform with x and y control. The center of mass information is used to automatically adjust the location of the motorized platform to achieve payload balance.

In another embodiment, one or more of the parameters is used as an input to automatically adjusting the manner in which the robotic system is controlled.

For example, in some embodiments, where moment of inertia about the pan axis is determined, this is used as an input to controlling motion about that axis. The following are a few specific examples of how such control might be implemented; these examples might be used alone or in combination:

- when the moment is above some threshold, a capped or reduced acceleration is applied;
- when the moment is above a threshold, disallow use of the pan motor;
- apply a cap on the acceleration that is a linear or nonlinear function of the moment of inertia;
- inform an operator;
- use the information in a predictive lifetime calculations due to additional gear wear;
- uploading measured value to a database for the purpose of remote diagnosis or general health indication;
- identify and advise of impending problems based on trend analysis.

In another example, total column weight is used as an input to controlling the vertical motion of the robotic system. The following are a few specific examples that might be used alone or in combination:

- when the total weight is above a threshold, a capped or reduced vertical speed is applied;
- when the total weight is above a first threshold, disallow use of the vertical motor
  - until the weight is reduced below a second threshold (which may be the same or different than the first threshold);
- inform the operator.

In another example, track axis measurements (e.g. traction), are used to predictively indicate wheel wear.

Some of the embodiments described above involve taking measurements at various positions on a track. In some embodiments, this may rely on an automated mechanism for determining the absolute location of the robot on the track. This may involve use of wiredraw linear encoders in order to precisely determine the position of the robot on a track. A wiredraw linear encoder unwinds a wire that is attached to the robot on the track. The amount of unwinding is encoded as a linear position of the robot along the track. Position can be inferred by using wheel rotation but is subject to inaccuracy due to wheel slip.

In addition, quite aside from the need for position information in association with measurements of the operating environment, some robotic applications have the need for absolute position measurement during actual use. As a specific example, in a video application with a virtual background, with a camera mounted on a robot moving on a track, absolute position may need to be measured to a precision of around 1 mm on a track that can extend for several meters. The measurement needs to be absolute in that the robot knows exactly where it is at all times, including immediately after power up.

A method of encoding, and determining track position is provided in which a required resolution and range is achieved by making simultaneous readings of multiple smaller sensor arrays (say 4 bits) and combining multiple measurements to get a required (say 16 bits or more) resolution.

In a specific example, assume that up to $2^n$ unique positions are to encoded, and m bits of a pseudo random sequence are encoded into or near the rails in some way (could be labels or etching of some form) for each position to be encoded, where km=n, such that the bits of k m-bit encoding marks can be combined to form an n-bit codeword. An m bit sensor array on a platform moving on the track (e.g. a dolly) observing these codes at a given position would observe one of $2^m$ allowable combinations, meaning that as the platform moves along the rail the same bits would appear for multiple rail positions. However, when a second sensor array is added, spaced from the first so as to read m bits from a second position on the rails, these m bits can be combined with the first m to result in an 2 m bit word, the code would still repeat but less frequently. Additional sensor arrays can be added to obtain 3 m bit, 4 m bit and 5 m bit resolution, etc. with the result that eventually the combined code uniquely defines a track position to the required n bit resolution. The minimum size of the combined code needed to uniquely identify track positions will be a function of the required accuracy, and the length of the track.

Now, by way of more specific example, it is assumed that one mm accuracy is required, and that the codes employed allow for the identification of up to $2^{16}$ track positions. This means the approach in this example could be used for a track as long as 65.536 m. However, the same code can be used for a shorter track. For this example, assume there are N track positions P1 to PN spaced 1 mm apart to be encoded, and assume that m=4 bit codewords are to be employed. The menu of available 4-bit codewords is c1 to c16, which includes all the possible unique 4 bit codewords.

Figure 14A:
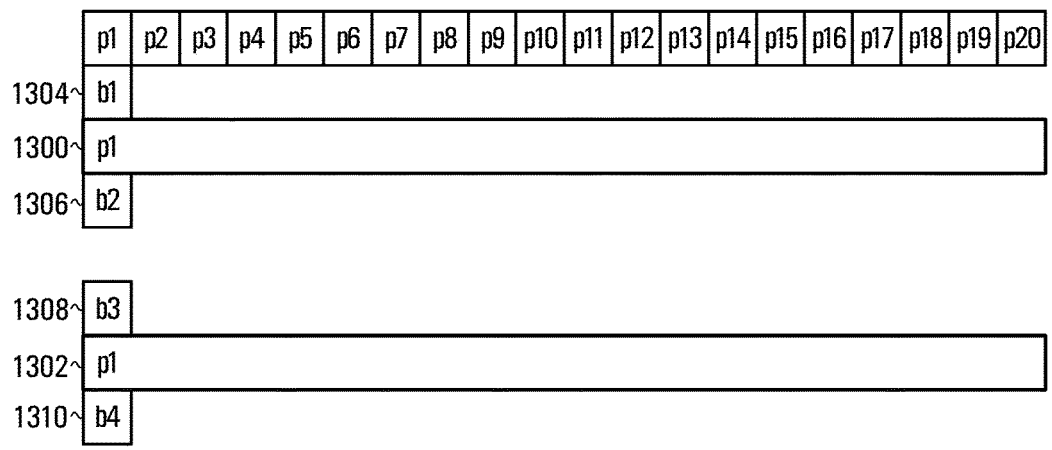
FIG. 14A is a plan view of a track showing an encoding matrix.

Referring now to FIG. 14A, shown is a track with two rails 1300,1302. For a given position on the track, to the required resolution, one mm in this example, there is a 4 bit encoding mark selected from the menu of available 4-bit codewords. Thus, for example at track position P1, there is a 4 bit encoding mark p1 formed of bits b1,b2,b3,b4. Similarly, there is a respective 4 bit encoding mark pi for each track position Pi, for I=1, . . . , N. The first 20 encoding marks p1 to p20 are shown by way of example in FIG. 14A.

Figure 14B:
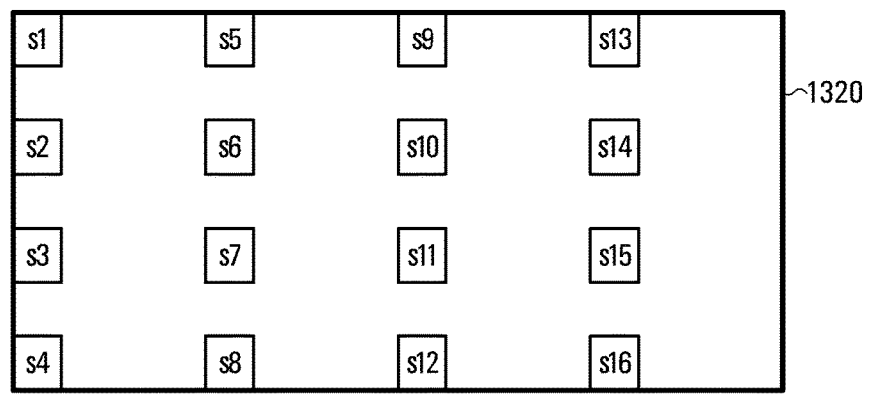
FIG. 14B is a plan view of a platform with sensors for reading the encoding marks of FIG. 14A.

Referring now to FIG. 14B, a platform 1320 that operates on the track is equipped with single bit sensors s1 to s16 that are situated to read 16 bits, that include the bits of four of the encoding marks simultaneously. In the illustrated example, the sensors are situated so as to read 4 bit encoding marks that are spaced 4 encoding positions apart. Thus, when the platform is in position k, the four sets of sensors will read encoding marks pk, pk+4, pk+8, pk+12. Some other permutation of encoding marks may alternatively be read depending on the spacing of the sensors.

In position 1, the sensors will read p1, p5, p9, p13, as depicted in FIG. 14C. In position 5, the sensors will read p5,p9,p13,p17, as depicted in FIG. 14d. A single 4-bit encoding mark does not uniquely identify the position of the robot on the track. The 16 bits are then used to determine the position of the robot. Either the robot may have position decoding capability, or the read encoding mark can be fed back to a robotic system controller.

Various coding schemes (other than pseudo random) may give better results. In the described embodiment, there are 4 sets of sensor arrays that each read a 4 bit codeword. Alternatively, a reduced number of sensors could be used that scan multiple bits of the codeword. This can be a function of how the codewords are applied to/near the track.

While the example described above has focused on track position, more generally, a similar approach can be used to accurately determine absolute location within any linear translation environment, for example an elevation column. A similar approach can be used in a rotational translation environment.

While particular implementations and applications of the present disclosure have been illustrated and described, it is to be understood that the present disclosure is not limited to the precise construction and compositions disclosed herein and that various modifications, changes, and variations may be apparent from the foregoing descriptions without departing from the scope of an invention as defined in the appended claims. Furthermore, it should be noted that the various measurements and processes disclosed may be carried out in any order without departing from the scope of the invention defined in the claims.

What is claimed is:

1. A method of determining at least one operating characteristic of a robotic system, wherein the robotic system comprises a motor for driving motion of a payload about an axis of rotation, the method comprising:
    determining a location of a center of mass of the payload by:
    controlling the motor to hold the payload static in at least three angular positions, and for each position determining a respective torque applied by the motor to hold the payload static; and
    determining a residual center of mass offset angle and a distance of the center of mass from the axis of rotation based on the determined torques.

2. The method of claim 1 wherein controlling the motor to hold the payload static in at least three angular positions, and for each position determining a respective torque applied by the motor to hold the payload static comprises:
    controlling the motor to move the payload to first and second angular positions, and measuring corresponding first and second torques;
    controlling the motor to move the payload to a third angular position about the axis of rotation that is the opposite of the residual center of mass offset angle such that the center of mass is horizontally positioned relative to the axis of rotation and measuring a third torque applied to the motor to hold the payload static;
    wherein determining a residual center of mass offset angle and a distance of the center of mass from the axis of rotation based on the determined torques comprises:
    determining the residual center of mass offset angle from the determined first torque and second torque; and
    determining a distance of the center of mass from the axis of rotation based on the third torque.

3. The method of claim 1 wherein the motor drives motion in a tilt axis.

4. The method of claim 1 wherein said payload comprises a video camera.

5. The method of claim 1 wherein said payload comprises a sensor.

6. The method of claim 1 further comprising determining a moment of inertia of a rotatable part of the robotic system about the axis of rotation, wherein said robotic system comprises the rotatable part by:
    controlling the motor to apply at least two known torques;
    for each applied torque, measuring a respective angular acceleration at said known torque while said rotatable part is in motion; and
    determining the moment of inertia from the known torques and the angular acceleration measurements.

7. The method of claim 6 further comprising adjusting control of the robotic system based on the moment of inertia.

8. The method of claim 6 further comprising flagging a moment of inertia determined to be above a predetermined threshold.

9. The method of claim 6 wherein determining angular acceleration comprises obtaining position information from an encoder that encodes position at the output of the motor, and converting the position information to acceleration.

10. The method of claim 6 performed to determine the moment of inertia about a tilt axis or pan axis or a tilt axis and pan axis of a pan tilt head.

11. The method of claim 6 for use with a robotic system having a vertical column and a lift motor, the column having a head carrying a payload, the method further comprising:
    controlling the lift motor to apply at least two known motor forces to the vertical column, forming part of the robotic system;
    for each applied force, measuring a respective linear acceleration that results from application of the force; and
    using the measured linear accelerations and the applied forces to determine a combined mass of the head, payload and moving part of column.

12. The method of claim 11 further comprising subtracting a head mass and a column mass from the combined mass to get a mass of the payload.

13. The method of claim 11 wherein each force is determined from a current applied to the lift motor, and each linear acceleration of the column is determined from position information encoded by an encoder at an output of the lift motor.

14. A method in an apparatus comprising a lift motor that lifts a column carrying a head and payload, with passive struts that assist the motor, the method comprising:
    controlling the lift motor to sequentially raise the column to a plurality of vertical positions and to hold the column steady while in each of the plurality of vertical positions;
    for each vertical position, determining a force applied by the lift motor to hold the column steady; and
    determining strut force as a function of vertical position based on the determined motor force and a combined mass of the column, head and payload.

15. The method of claim 14 further comprising determining the combined mass using the method of claim 11.

16. The method of claim 14 wherein determining strut force as a function of vertical position comprises determining $$F_s(z)=mg-F_m(z)$$

where $F_s(z)$ is the strut force at vertical position z, m is the combined mass, g is the force of gravity, and $F_m(z)$ is motor force at position z.

17. The method of claim 14 further comprising:
    generating a report containing strut force and motor holding force as a function of vertical position.

18. The method of claim 14 further comprising determining if any determined strut force is outside a predetermined range, and if so, generating an output indicating this.

19. A method for determining holding force $F_0$ and static friction force $F_{fs}$ about an axis of a robotic system, the method comprising:
    for each of at least one position:
    controlling the motor to generate a force that holds the axis steady in the position;
    gradually increasing force until movement is detected in a positive direction and storing a value $F_u$ representing the force when movement is detected;

returning to the position and gradually reducing force until movement is detected in a negative direction and storing a second value $F_1$ representing the force when movement is detected;

determining the holding force and static friction force based on the first and second value according to:

$$F_0 = \frac{F_u + F_l}{2}$$

and $$F_{fs} = \frac{F_u - F_l}{2}.$$

20. The method of claim 19 used to determine track characteristics of a track used by a robotic system having at least one motorized wheel running on the track.

21. The method of claim 19 further wherein the at least one position comprises a plurality of positions, the method further comprising automatically controlling the robotic system to move to each of the plurality of positions and determining the holding force and static friction for each of the plurality of positions.

22. The method of claim 19 further comprising for each of at least one track position:
    after friction force is reached at that position, applying additional force;
    monitoring wheel speed or motor speed along with robot speed while the additional force is applied;
    increasing the additional force applied until the wheel speed or motor speed is not consistent with robot speed; and
    determining a traction force to be the force being applied when the wheel speed or motor speed is not consistent with robot speed.

23. A method for determining track characteristics of a track used by a robotic system having at least one motorized wheel running on the track, the method comprising:
    moving the robot along the track at a velocity $v_c$;
    as the robot changes position on the track, monitoring wheel velocity as a function of position;
    determining track positions where the wheel velocity is above a wheel velocity consistent with the velocity $v_c$ by a threshold amount as positions where there is a loss of traction on the track; and
    determining track positions where the wheel velocity is below a wheel velocity consistent with the wheel velocity consistent with the velocity $v_c$ by a threshold amount as positions that are binding points on the track.

24. A robotic control system for use with a robotic system comprising an actuator that causes motion in an axis, the robotic control system comprising:
    a transmit channel for sending control commands to the actuator;
    a receive channel for receiving information from the robotic system;
    a robotic environment characterization controller that, for each of at least one operating characteristic of the robotic system:
    controls the actuator to perform a predetermined sequence of steps by sending control commands on the transmit channel;
    receives measurement information on the receive channel following performance of each step of said predetermined sequence of steps; and
    based on the received measurements, determines the operating characteristic of the robotic system.

25. The system of claim 24 comprising:
    a controller area network bus that implements the receive channel and the transmit channel.

* * * * *